United States Patent [19]

Hokky

[11] 4,086,034
[45] Apr. 25, 1978

[54] FLUID COOLED COMMUTATED ELECTRIC MOTOR DRIVING A PUMP

[75] Inventor: Stephen G. Hokky, North Olmsted, Ohio

[73] Assignee: Airborne Mfg. Co., Elyria, Ohio

[21] Appl. No.: 677,775

[22] Filed: Apr. 16, 1976

Related U.S. Application Data

[60] Division of Ser. No. 552,174, Feb. 24, 1975, Pat. No. 3,982,146, which is a continuation-in-part of Ser. No. 341,539, Mar. 15, 1973, abandoned.

[51] Int. Cl.² .................... F04B 35/04; H02K 9/28
[52] U.S. Cl. .............................. 417/369; 417/424; 310/63; 310/227
[58] Field of Search ............... 417/366, 370, 369, 410, 417/424; 310/63, 227, 89, 40 MM, 242, 244, 245, 90

[56] References Cited

U.S. PATENT DOCUMENTS

| 1,476,776 | 12/1923 | Stamm et al. | 417/366 |
| 2,965,038 | 12/1960 | Purden et al. | 417/424 |
| 3,020,104 | 2/1962 | Nichols | 308/238 |
| 3,397,531 | 8/1968 | Dubois | 308/238 |
| 3,525,001 | 8/1970 | Erickson | 417/423 R |
| 3,875,436 | 4/1975 | MacFarland | 310/89 |
| 3,891,355 | 6/1975 | Hecht et al. | 310/63 |
| 3,897,178 | 7/1975 | Palloch | 417/366 |
| 3,982,146 | 9/1976 | Hokky | 310/89 |

Primary Examiner—Carlton R. Croyle
Assistant Examiner—Thomas I. Ross

[57] ABSTRACT

A commutated electric motor, which motor is cooled by the fluid which it pumps. The motor has a molded end cover construction, the material being the bearing material, and providing for guiding of the brushes. Torsion springs are utilized as the sole biasing means and current carrying members for the brushes. Also, the fluid is pumped along a closed channel structure and directed against the brushes to increase endurance.

5 Claims, 10 Drawing Figures

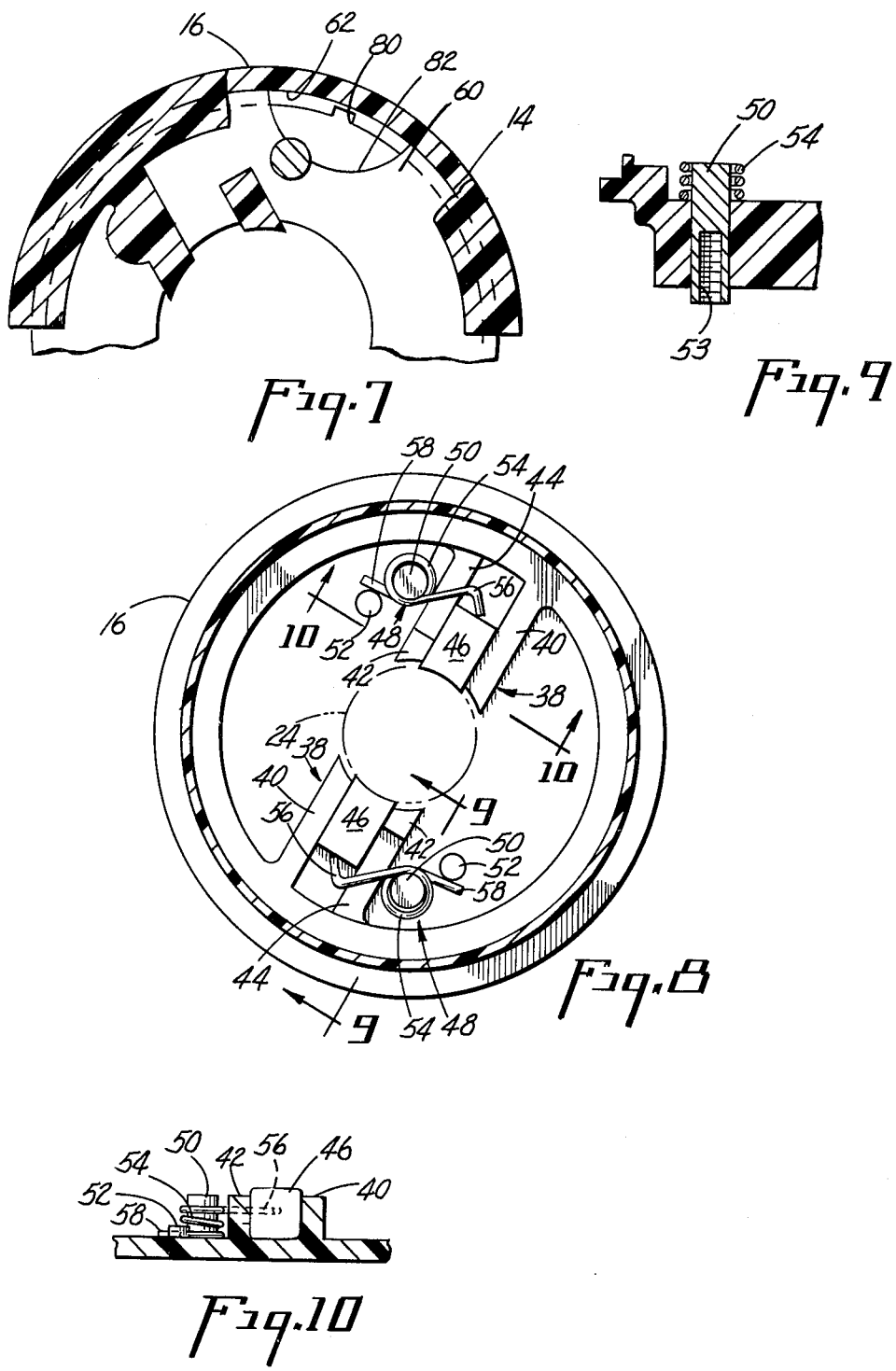

FLUID COOLED COMMUTATED ELECTRIC MOTOR DRIVING A PUMP

BACKGROUND OF THE INVENTION

This is a division of application Ser. No. 552,174, filed Feb. 24, 1975, now U.S. Pat. No. 3,982,146, which is a continuation-in-part of application Ser. No. 341,539 filed Mar. 15, 1973 for "Fluid Cooled Commutated Electric Motor", now abandoned.

This invention relates generally to electric motors and is especially adaptable to commutated electric motors, specifically those which drive a fluid pumping unit wherein the pumped fluid is utilized to cool the motor. More specifically, the present invention is particularly adaptable for use as an in-line fuel pump in vehicles utilizing an internal combustion engine.

The use of in-line fuel pumps and submersible pumps for pumping fuel in internal combustion engines is quite extensive and it is well known to use a DC electric motor to drive the pumping unit. It is desirable in these electric motors to utilize the fuel being pumped to increase their life.

In this art it is very desirable to reduce to a minimum the costs involved in producing such a pump and motor unit while still retaining efficient and reliable pumping characteristics over the demand range of the vehicle's various operating parameters. Also of particular importance is to provide a relatively long lasting motor which does not require frequent repair or part replacement such as the replacing of brushes or bearings and reworking of the commutator.

SUMMARY OF THE INVENTION

According to the present invention a relatively inexpensive highly reliable long lasting electric motor is provided, especially adapted for use in a fuel pump drive, which motor has a unique end cap construction, and a unique brush mounting and current carrying construction and a unique construction for increasing endurance by cooling with the pumped fluid.

DESCRIPTION OF THE DRAWING

FIG. 7 is a sectional view taken substantially along the plane designated by the line 7—7 of FIG. 4;

FIG. 8 is a sectional view taken substantially along the plane designated by the line 8—8 of FIG. 1;

FIG. 9 is a sectional view taken substantially along the plane designated by the line 9—9 of FIG. 8; and FIG. 10 is a sectional view taken substantially along the plane designated by the line 10—10 of FIG. 8.

DESCRIPTION OF THE PREFERRED EMBODIMENT

Figure 1:
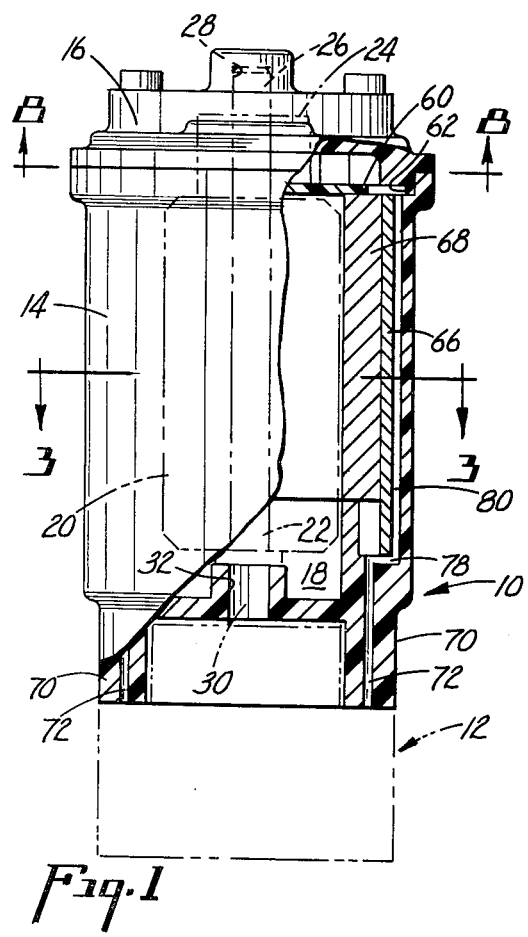
FIG. 1 is a side elevational view partially in section with parts broken away for clarity, of an electric motor according to this invention showing in phantom outline a pumping unit secured thereto.
Figure 2:
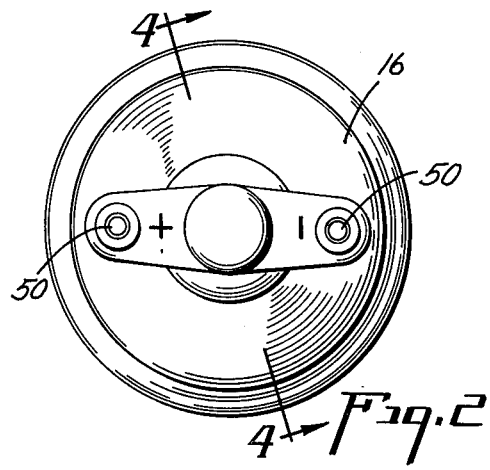
FIG. 2 is a plan view of the motor of FIG. 1.
Figure 3:
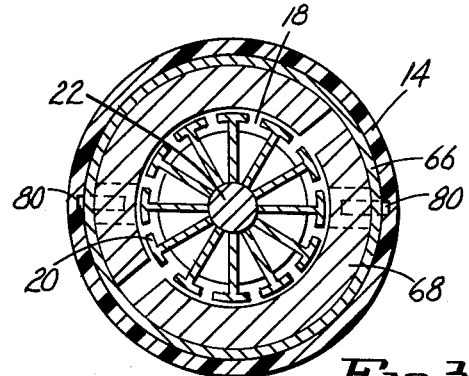
FIG. 3 is a sectional view taken substantially along the plane designated by the line 3—3 of FIG. 1.
Figure 4:
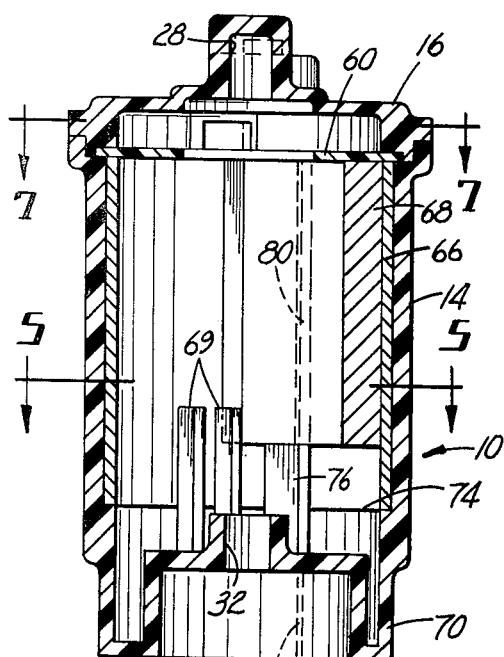
FIG. 4 is a longitudinal sectional view taken substantially along the plane designated by the line 4—4 of FIG. 2.
Figure 5:
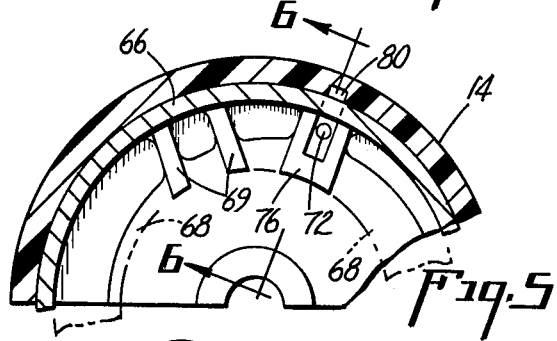
FIG. 5 is a sectional view taken substantially along the plane designated by the line 5—5 of FIG. 4.
Figure 6:
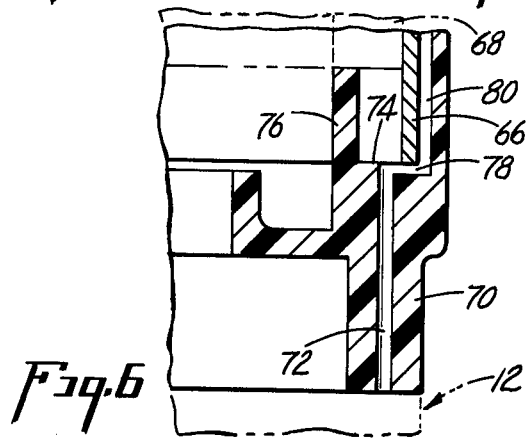
FIG. 6 is a sectional view taken substantially along the plane designated by the line 6—6 of FIG. 5.

Referring now to the drawing, and for the present to FIG. 1, a motor unit 10 formed according to this invention is shown, which is connected to and operatively drives a pumping unit 12 shown in phantom outline. The device of the present invention will be shown and described as particularly adapted for use as an in-line fuel pump for pumping fuel, e.g. gasoline, to an internal combustion engine although it is not so limited.

Referring now to FIGS. 1 and 3 through 6, the motor unit 10 includes a motor housing 14 and an end cover 16 which are joined together to provide a fluid tight interior chamber 18. A motor armature 20 is disposed within the chamber 18, the armature 20 being mounted on an armature shaft 22. A commutator 24 is also mounted on the shaft 22 axially spaced from the armature 20. The shaft 22 has one end portion 26, adjacent the commutator, which is mounted in a bearing recess 28 formed in the end cover 16 and another end portion 30 mounted in a bearing surface 32 formed in the housing 14 and extending therethrough to operatively drive the pumping unit.

Both the motor housing 14 and the end cover 16 are formed of a moldable, structural material having self-lubricating bearing properties, and which material is resistant to degradation by the fuel being pumped and having high impact resistance and capable of being secured together. In addition the end cover must be an electrically non-conductive material. One particular desirable material for such construction of both the body and end cover is a 30 percent glass filled nylon such as "Zytel" 70G33 sold by E. I. DuPont Company. With this material the housing material itself and end cover material itself can act as bearing surfaces thus eliminating the need of supplying and inserting separate bearing members for mounting the shaft. Further, the molding operation can supply both thrust and rotary bearing support as needed all from a single molding operation.

Turning now to FIGS. 7 through 10, the end cover 16 is molded with a pair of brush guides generally designated as 38, each formed with a pair of side walls 40 and 42. Each of the side walls 42 is formed with a notch 44 therein. A pair of brushes 46 are mounted, one in each of the brush guides 38. A pair of torsion springs 48 are provided to bias the brushes 46 into contact with the commutator 24. In order to mount the torsion springs 48 the cover 16 is formed with a pair of mounting posts 50 and a pair of reaction posts 52. The reaction posts 52 are molded as an integral part of the cover and thus formed of the material of which the cover is formed. The mounting posts 50 are current carrying posts preferably formed of non-ferrous copper alloy inserted into the cover and extending therethrough to act as current carrying members to supply current to the brushes from an external source. These posts 50 may be threaded externally, as shown at 53 to threadably receive a screw to afford an electrical connection in a well-known manner. The torsion springs 48 are formed with central coiled portions 54 surrounding the mounting posts 50, first end portions 56 extending through the notches 44 and engaging one end of the brush, and second end portions 58 engaging the reaction post. The torsion springs are formed of a current carrying homogeneous material having good spring properties. One such material is phosphor bronze which is excellent for this purpose. Other conventional standard wire material could also be utilized, depending upon current carrying requirements.

The springs 48 are formed of a wire size and wound to such a configuration that they will bias the brushes 46 against the commutator 24 with sufficient force to produce proper engagement. Also by virtue of the fact that the central coil portions 54 are in contact with a mounting post 50 the current can be supplied from external source through the mounting post 50 the torsion springs 48 and the brushes 46 to the commutator 24. By virtue of the fact of using a torsion spring, a size wire large enough to carry relatively high current, which these types of motors require, can be employed with the biasing force thereof being sufficiently small and easily controllable to provide the proper biasing force of the brush against the commutator and compensate for brush wear. Thus no separate pigtail connections to the brush and the post 50 are required, a simple easily insertable homogeneous coil spring serving the entire function of being both the sole current carrying member and the sole biasing member for the brushes thus simplifying the construction of the motor.

In order to retain the brushes properly in the brush guides 38 when the cover is secured to the housing, a brush support disc 60 is provided (see FIGS. 1, 4, and 7) which is interposed between the cover member 16 and the housing 14 to support the brushes. The brush support disc 60 resides in a relieved or neck portion 62 of the housing and is firmly secured between the housing and the cover when the cover 16 is secured to the housing 14. Preferably this securing of the cover 16 to the housing 14 is by ultrasonic welding of the glass filled nylon material which will provide a fluid tight connection between the cover and the housing and prevent the escape of fluid therefrom.

One of the features of the present invention is to provide a positive flowing stream of the fluid at the brush commutator interface to increase endurance. The construction of this device provides for this feature as shown in detail in FIGS. 1 and 4 through 7, to which reference is now made.

Disposed within the housing 14 is an annular galvanized steel shell or liner 66 which engages the interior surface of the housing 14. Also disposed within the housing 14 in the interior chamber 18 is a pair of permanent magnets 68 which will form a field to rotate the armature in a well-known manner. The magnets are maintained in proper circumferential position by molded-in guides 69.

The housing 14 is molded with a depending annular rim 70 which engages with the pumping unit 12. Extending through the annular rim 70 are a pair of through bores 72 spaced approximately 180° from each other. Each of these bores is the initial portion of the closed channel structure for directing the cooling fluid to one of the brushes. Only one of the channel structures will be described in detail, it being understood that the other is identical to it, and being spaced 180° therefrom. One channel acts as a supply for the fluid and the other as a return.

The through bore 72 terminates at an annular shelf 74 which acts as an end support for the shell 66. Extending upwardly from this annular shelf 74 is a reservoir forming member 76 closed on three sides and open at the top and on the side directed toward the shell 66. The magnet 68 rests on top of the member 76 closing the end thereof, and the open side of the member 76 directed toward the shell 66 is closed by this shell 66 so that the member forms a completely enclosed fluid reservoir.

A transverse groove 78 is formed on the annular shelf 74 which joins with a longitudinal groove 80 formed in the interior wall of the housing 14 along the length thereof. The end of the shell 66 closes off the transverse groove and the outer wall of the shell 66 closes off the longitudinal groove 80 thereby forming a closed passageway from the end of the through bore 72 to the opposite end of the housing 14.

The longitudinal groove 80 terminates adjacent the brush support disc 60, which brush support disc 60 has a cutout portion 82 aligned therewith to provide an opening to the interior of the cover 16 where one of the brushes 46 is mounted. This cutout portion 82 of the brush support disc 60 extends to a region adjacent the mounting of one of the brushes so as to provide a continuous closed channel from the pumping unit 12 directly to the region of the brushes. As indicated above, a second identical continuous channel is formed 180° from that described and acts as a return for the fluid after it has flowed across the other brush-commutator interface.

The through passages 72 are connected to the pumping chamber so that when the motor unit operates the pumping unit, fluid will flow through one of the enclosed channel structures defined by the through passage 72, the closed transverse groove 78, the closed longitudinal groove 80, and the cutout 82 of the brush support disc 60 directly to the region of one of the brushes 46. A portion of the fluid will fill the chamber, and the fluid will also flow past the other brush and be discharged to the pumping unit through the other channel structure. This channelled pressure flow will greatly enhance endurance. Also, the fluid cools the tension springs, thus assuring long life, even under heavy current loads.

Of course, a certain amount of the fluid filling the interior chamber 18 returns to the pumping unit by leakage through the space between the bearing surface 32 and the shaft end 30, thereby providing bearing lubrication.

While the invention had been described in some particularity it is believed that it essentially comprises an improved motor unit especially adapted for pumping fluid which has a unitary end cover structure molded out of high impact insulating bearing plastic which structure acts as a bearing, a brush guide, a brush cover, and provides a leak tight connection to the housing. Also, the invention provides a unique structure utilizing homogeneous torsion springs for both providing the sole biasing force of the brushes against the commutator and also the sole current carrying member for providing current to the brushes. Further, the invention provides a structure for channeling liquid coolant in a closed channel structure from one end of the housing to the opposite end and directing a flow of the fluid to the brush-commutator interface to increase the brush-commutator life.

What is claimed is:

1. In an electric motor-pump combination, wherein the electric motor includes shaft means operating pump means from the end portion of said shaft means, and wherein said shaft means has a commutator on the opposite end portion which commutator cooperates with a pair of brushes, and wherein said motor includes a motor housing, the improvement comprising, a unitary molded cover structure formed of structural non-conducting bearing material, said cover material being molded to form a bearing structure for one end of said shaft and means to mount and guide said pair of brushes, said cover structure also including first and second sets of mounting means and reaction means, as least one of said means of each set being formed of low resistance current carrying material and extending externally of said cover structure, a pair of torsion springs each formed of a low resistance homogenous current carrying material, each torsion spring having first and second opposite end portions and a central coiled portion, the cetral coiled portion of each of the springs being wrappingly engaged around one of the mounting means, the first end portion of each of the springs engaging one of the reaction means, the second end portion of each of said springs engaging the end of one of the brushes opposite the end thereof engaging the commutator, each of said torsion springs acting as the sole current carrier to its respective brush, whereby a single spring acts both as a biasing element and sole current carrying element thereby providing brushes free of separate electrical connections, said cover structure being molded to form a fluid tight enclosure with said housing, and a closed channel structure defined at least in part by said motor housing extending from said pumping means and having openings terminating adjacent each of the brush means, whereby during the pumping operation a stream of pumped fluid is directed against the brush to cause a fluid flow at the brush-commutator interface.

2. In an electric motor-pump combination, wherein the electric motor includes armature shaft means for driving pump means from one end portion thereof, and wherein said armature shaft means had a commutator on the opposite end portion thereof cooperating with a pair of brushes, and wherein said motor includes a coaxial motor housing having a cover for one end of said housing forming an enclosure for said commutator and the adjacent end of said shaft, brushes slideable in said cover and contacting said commutator, and means in said enclosure for maintaining sliding contact between said brushes and said commutator and for conducting current to said brushes, the improvement comprising that said cover is made of structural, load bearing, non-conducting, low friction material having bearing properties, and said cover has brush guides molded therein and has a conductor extending from inside to outside thereof, and has a coaxial bearing molded therein for supporting the proximate end of said armature shaft, said motor and said pump means being submersible in cool liquid which is pumped by said pump means, said molded brush guides and cover comprising three sides of a channel for said brushes, a brush support disc closing the fourth side of said channel and forming a chamber with said cover, and means for conducting cool liquid from said pump to said chamber for lubricating and cooling said commutator and cooling said conducting means and said brushes.

3. The improvement of claim 2 wherein said means for conducting current to said brushes is mounted on said conductor, and said cover has a post molded therein coacting with said conductor and said means.

4. The improvement of claim 2 wherein said disc is apertured adjacent said commutator for diverting liquid toward said commutator.

5. The improvement of claim 2 wherein said cover, and said housing have mutual, fluid-tight engagement and mutually engage said disc to form the chamber between said cover and said disc containing said brushes, said commutator and said conducting means.

* * * * *